United States Patent [19]
Shimizu

[11] 3,831,182
[45] Aug. 20, 1974

[54] WATER-PROOF CAMERA CONSTRUCTION
[75] Inventor: Terushige Shimizu, Kawasaki, Japan
[73] Assignee: Nippon Kogaku K. K., Tokyo, Japan
[22] Filed: Dec. 18, 1973
[21] Appl. No.: 425,823

[30] Foreign Application Priority Data
Dec. 25, 1972 Japan.......................47-147674

[52] U.S. Cl............................................354/64
[51] Int. Cl. ......................................... G03b 17/08
[58] Field of Search ................................ 95/11 UW

[56] References Cited
UNITED STATES PATENTS
3,162,106  12/1964  D'Oplinter ..................... 95/11 UW Primary Examiner—John M. Horan
Attorney, Agent, or Firm—Fitzpatrick, Cella, Harper & Scinto

[57] ABSTRACT

A water-proof camera comprises a hinged back cover and an auxiliary back cover with resilient means interposed therebetween. A water-proof resilient member is provided inwardly of the auxiliary back cover so that it is urged against the body of the camera with a predetermined force when the hinged back cover is closed with respect to the camera body.

6 Claims, 4 Drawing Figures

PATENTED AUG 20 1974  3,831,182

WATER-PROOF CAMERA CONSTRUCTION

BACKGROUND OF THE INVENTION

1. Field of the Invention

This invention relates to a water-proof camera, and more particularly to a construction for such a camera having a hinged back cover.

2. Description of the Prior Art

Heretofore, in order to load a water-proof camera with a roll of film, it has been necessary to remove the operating mechanism of the camera body from the outer camera housing, instead of employing a system of opening and closing the hinged back cover of the camera. Of course, a water-proof packing is provided in the joint portion between the camera body and the outer camera housing. Thus, the film loading operation in water-proof cameras has been much more cumbersome than that in ordinary cameras, thus inducing a need for a system whereby a readily operable hinged back cover may be opened and closed for loading. In such a system, however, the provision of water-proof means for maintaining integrity becomes a matter for consideration.

It is known to employ O-rings as the water-proof seals in water-proof cameras, and such O-rings have normally been used in a manner whereby they are retained in the radial direction. In such cases, oil must be supplied to the O-rings, but the oil either makes the O-rings thicker or alters its own properties so that a greater force is required to remove the operating mechanism of the camera bodies from the outer camera housings. Moreover, the removal of the mechanism from the outer camera housings causes deformation or twist of the O-ring seals and this reduces the service life of the rings.

These disadvantages might be overcome by using the O-ring in such a manner that it is retained in its thrust direction. In this latter case, it is necessary to urge the entire O-ring with a predetermined force to provide a collapse margin, and this is done by tightening a plurality of fly nuts and bolts which, of course, means great inconvenience in the loading operation.

SUMMARY OF THE INVENTION

In view of the foregoing, I contribute by the present invention, a water-proof camera the hinged back cover of which may be employed as film loading means through the opening and closing operation, and in which a resilient water-proof packing for the opening-closing portion of the back cover is used in such a manner that it is retained in its thrust direction as described above, whereby the above-noted disadvantages are eliminated and the loading operation is made much simpler and easier.

To achieve this object, the water-proof camera of the present invention comprises a hinged back cover pivotally connected to the back side of the body of the camera and having a central opening therein. Retaining means are provided for releasably retaining the hinged back cover in its closed position with respect to the camera body and resilient means are securely fixed to the inner surface of the hinged back cover. An auxiliary back cover is mounted to the hinged back cover with the resilient means interposed therebetween, and this auxiliary back cover includes a thick-walled portion received in the opening of the hinged back cover, a stepped portion provided by a surface adapted to oppose a flat end surface formed peripherally of the camera body upon closing of the hinged back cover, and a further portion adapted to be positioned inwardly of the flat end surface of the camera body upon closing of the hinged back cover. The resilient means is attached to the hinged back cover in such manner that when the hinged back cover is closed, the resilient means is nipped between the hinged back cover and the auxiliary back cover so as to urge the entire auxiliary back cover against the camera body with a uniform force. A resilient water-proof member is engaged with the stepped portion formed peripherally in the inner surface of the auxiliary back cover. Thus, upon closing of the hinged back cover, the resilient water-proof member is nipped between the stepped portion of the auxiliary back cover and a flat end surface of the camera body and uniformly collapses thereby to prevent entry of water into the interior of the camera.

The resilient means may comprise two plate springs which have their center portions fixed to the central upper and lower portions, respectively, of the inner surface of the hinged back cover and which have their opposite ends formed with cut-away grooves for engagement with pins provided on the auxiliary back cover.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein.

DESCRIPTION OF THE PREFERRED EMBODIMENTS

Figure 1:
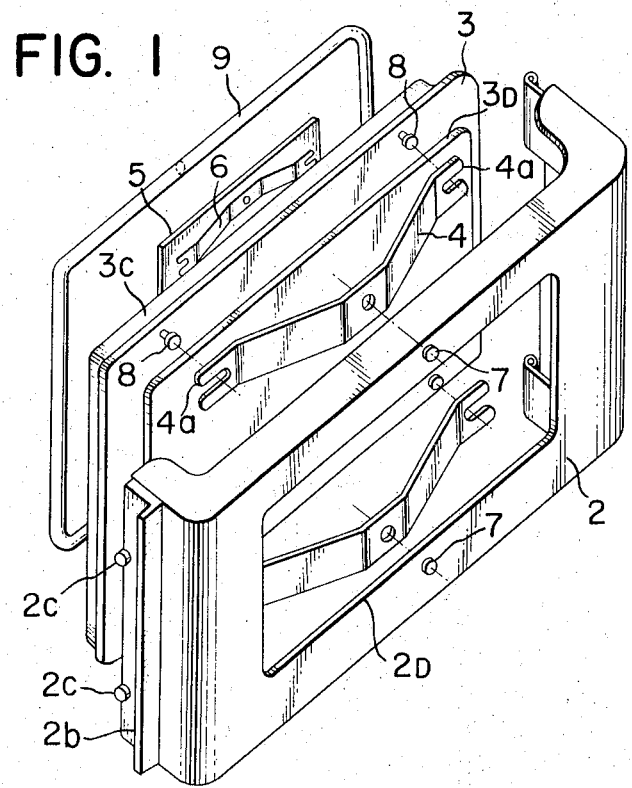
FIG. 1 is a perspective view of the back cover portion of a camera according to an embodiment of the present invention.
Figure 4:
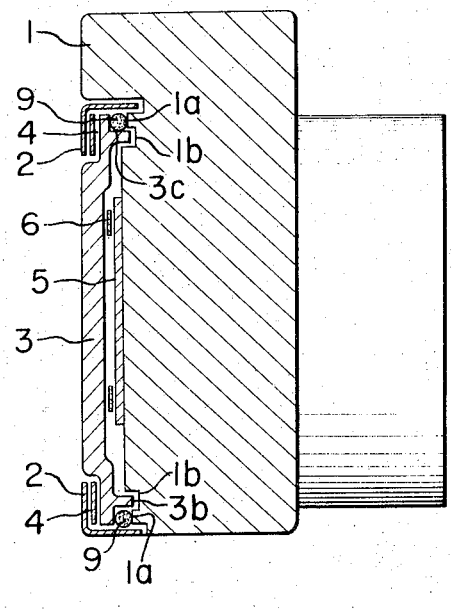
FIG. 4 is a vertical section of the camera body and the back cover portion.
Figure 2:
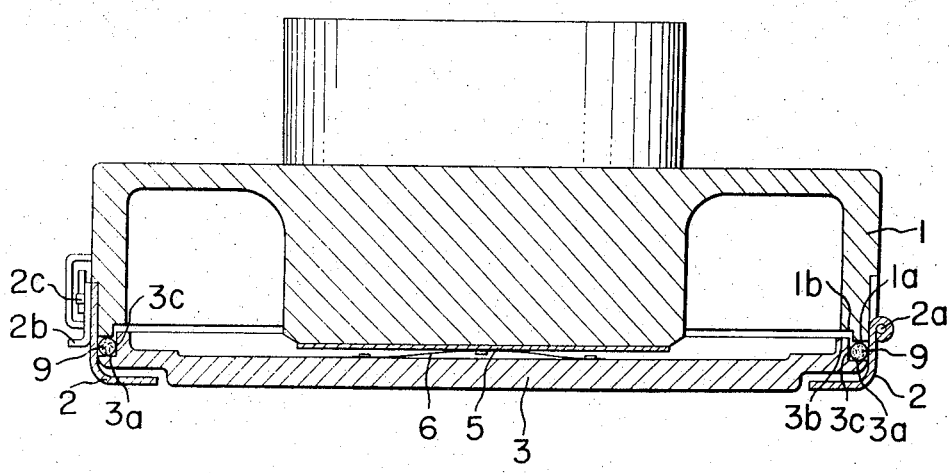
FIG. 2 is a horizontal sectional view of the camera body and the back cover portion.
Figure 3:
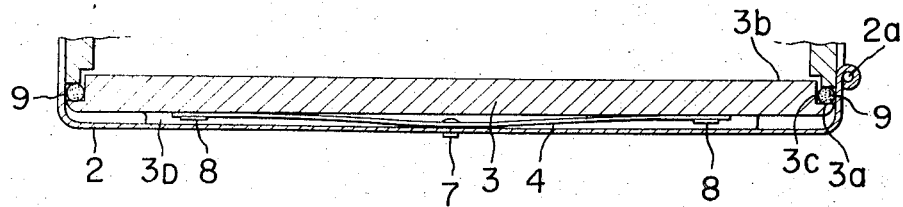
FIG. 3 is a fragmentary sectional view of the back cover portion.

Referring to the drawings, there is shown a camera body 1 having a hinged back cover 2 pivotable about hinge means 2a. The back cover has a retaining plate 2b and retaining pins 2c, and is similar to those of conventional cameras. Centrally of the hinged back cover 2, there is formed an opening 2D for receiving therein a reinforcing thick-walled portion 3D of an auxiliary back cover 3, which will be described further, for providing good drainage. The auxiliary back cover 3 has secured thereto pins 8 which are movably engaged by cut-away grooves 4a formed in the opposite end portions of plate springs 4 which will be described later. The plate spring 4 is securely fixed to the hinged back cover 2 by means of pins 7 studded in the cover 2 substantially centrally in the upper and lower portions thereof. A pressure plate 5 is attached to the auxiliary back cover 3 by means of plate springs 6, and a resilient, water-proof packing 9 such as O-ring or the like has a circular cross-section and is engaged with a stepped portion 3a, 3c formed in the auxiliary back cover 3.

With the above-described construction, when a roll of film is loaded into the camera, the back cover 2 may be pivoted about the hinged means 2a and urged against the camera body 1. Thereupon, the retaining pins 2c are retained securely with respect to the back cover by a conventional back cover lock means. Under these circumstances, the auxiliary back cover 3 is forced toward the camera body 1 by the plate springs 4, so that the packing 9 engaged with the stepped portion 3a, 3c, extending along the periphery of the inner surface of the auxiliary back cover 3, is urged against a flat end surface 1a of the camera body 1. However, the packing 9 is stopped by the flat end surface 1a of the camera body 1 and thus, the plate springs 4 are flexed so that the packing 9 interposed between the stepped portion 3a of the auxiliary back cover 3 and the flat end surface 1a of the camera body 1 is urged with a predetermined force, thereby providing a collapse margin for the packing 9. This is useful to prevent water invasion not only when a normal pressure is being exerted on the back cover, but also when any extraneous pressure is imparted thereto, because such pressure acts in a direction to collapse the packing. Moreover, for an extraneous pressure exceeding a certain value, the end surface 3b of the auxiliary back cover 3 is urged against the flat end surface 1b of the camera body 1 to prevent permanent deformation of the packing 9 and further prevent any adverse effect on the pressure plate 5.

According to the present invention, as described above, the hinged back cover construction permits film loading to be accomplished as easily as in the conventional cameras. The packing can be retained for water-proof effect simply by the opening-closing operation of the back cover. Further, even the existance of some degree of mounting error in the relative position of the hinge axis and the back cover lock means would never affect the contact surface of the packing.

I believe that the construction and function of my novel camera construction will now be understood and that the advantages thereof will be fully appreciated by those persons skilled in the art.

I claim:

1. A water-proof camera construction comprising: a camera body;
a hinged back cover pivotally connected to the back side of the body of the camera;
retaining means for releasably retaining said hinged back cover in its closed position with respect to said camera body;
an auxiliary back cover positioned for movement relatively to said hinged back cover;
resilient means positioned between said back covers so that when said hinged back cover is closed said resilient means is nipped between said hinged back cover and said auxiliary back cover to urge the entire auxiliary back cover towards said camera body with a uniform force; and
a resilient water-proof member adjacent a peripheral area of the inner surface of said auxiliary back cover;
whereby on closing of said hinged back cover said resilient water-proof member is nipped between said auxiliary back cover and said camera body and uniformly collapses to seal the interior of the camera against entry of water.

2. A construction according to claim 1, wherein said resilient means comprises a plate spring and same is attached to one of said back covers.

3. A construction according to claim 1, wherein said resilient means comprises two plate-like resilient members which have their center portions fixed to the central upper and lower portions respectively, of the inner surface of said hinged back cover and which have their opposite site ends formed with cut-away grooves for engagement with pins provided on said auxiliary back cover.

4. A camera construction according to claim 1, wherein said hinged back cover has an opening formed centrally thereof, and said auxiliary back cover includes a thick-walled reinforced portion received in said opening of said hinged back cover.

5. A water-proof camera construction comprising: camera body means;
a hinged back cover pivotally connected to the back side of the body means;
retaining elements for releasably retaining said hinged back cover in its closed position with respect to said camera body;
auxiliary back cover means positioned for movement relatively to said hinged back cover;
one of said means formed with a peripheral step facing the other of said means;
plate spring means between said back covers and attached to one of said covers so that when said hinged back cover is closed said resilient means is nipped between said hinged back cover and said auxiliary back cover to urge the entire auxiliary back cover towards said camera body with a uniform force;
a resilient water-proof member positioned in said peripheral step; and
whereby on closing of said hinged back cover said resilient water-proof member is nipped in said step between said auxiliary back cover means and said camera body means and uniformly collapses to seal the interior of the camera against entry of water.

6. A construction according to claim 5, wherein one of said first two means is formed with a surface adapted to abut a surface of the other said means to limit the force which can be exerted on said resilient water-proof member.

* * * * *